US009391993B1

(12) United States Patent
Winer et al.

(10) Patent No.: US 9,391,993 B1
(45) Date of Patent: Jul. 12, 2016

(54) SHARING CONTENT BY INDICATING ACTIVITY FROM USERS IN A SOCIAL NETWORK

(71) Applicant: Google Inc., Mountain View, CA (US)

(72) Inventors: Adam Winer, San Francisco, CA (US); Ryo Misha Urano, Sunnyvale, CA (US); Evan Mallory Gilbert, Oakland, CA (US); Bénigne Deprey, Palo Alto, CA (US); Alexandra Levich, Mountain View, CA (US); Ben Tauber, San Francisco, CA (US)

(73) Assignee: Google Inc., Mountain View, CA (US)

( * ) Notice: Subject to any disclaimer, the term of this patent is extended or adjusted under 35 U.S.C. 154(b) by 99 days.

(21) Appl. No.: 14/280,521

(22) Filed: May 16, 2014

Related U.S. Application Data

(60) Provisional application No. 61/824,936, filed on May 17, 2013.

(51) Int. Cl.
*H04L 9/32* (2006.01)
*H04L 29/06* (2006.01)

(52) U.S. Cl.
CPC .................... *H04L 63/101* (2013.01)

(58) Field of Classification Search
CPC ..... G06F 21/10; G06F 21/31; G06F 21/6218; G06F 2221/2141; H04L 63/102
USPC .......................................................... 726/28
See application file for complete search history.

(56) References Cited

U.S. PATENT DOCUMENTS

2012/0110474 A1\* 5/2012 Chen ...................... G06Q 10/10
715/753

\* cited by examiner

*Primary Examiner* — Baotran N To
(74) *Attorney, Agent, or Firm* — McDermott Will & Emery LLP

(57) ABSTRACT

The subject technology discloses configurations for receiving an indication of user activity from a first user with respect to a post, wherein the post includes content shared by a second user, in response to receiving the indication, an activity post providing an indication of the user activity with respect to the post is created, the activity post including the content, and a set of users that the activity post is visible to are identified, the set of users comprising one or more users selected from users associated with the first user in a social graph, the activity post is provided for display to the set of users in response to the indication.

20 Claims, 11 Drawing Sheets

What's Hot

— 105

Jon Smith
Shared publicly, 5 hours ago

Why do galleries paint their walls white? Maybe it's to give viewers a more "pure", undistracted experience of the art. Or maybe it helps to maintain a clean, sterile space for expensive works. Mostly, though, it's just a tradition, bound up with embrace of Modern Architecture and good taste.

Beyond The White Cube
6 Experimental Museums

160 — +1's help your friends find cool stuff
When you +1 a post, people in your circles may see in their stream. (?)

150 — | +103 | ↪ |  — 155

View 46 comments

110 — Mike Buzzev 4 minutes ago — 130
What no baby deer bathing a kitten?

115 — Patrick Mullerony 20 minutes ago — 135
as long as it degrades if you don't take action quickly 120 — Pam Swango 20 minutes ago — 140
S.F. ballerina Kimberly Braylockerino spills the deets on her routine 170 — Add a comment

Mike Buzzev and 4 more +1'd this post ⟋280

Jon Smith
Shared publicly 5 hours ago

Why do galleries paint their walls white? Maybe it's to give viewers a more "pure", undistracted experience of the art. Or maybe it helps to maintain a clean, sterile space for expensive works. Mostly, though, it's just a tradition, bound up with embrace of Modern Architecture and good taste.

Beyond The White Cube
6 Experimental Museums anydesignXYZ.com

[+4]  [↗]                [Add Jon Smith]
                               ⟍215
View 17 comments
Add a comment

SHARING CONTENT BY INDICATING ACTIVITY FROM USERS IN A SOCIAL NETWORK

CROSS-REFERENCE TO RELATED APPLICATION

The present application claims the benefit of U.S. Provisional Patent Application Ser. No. 61/824,936, entitled "Sharing Content By Indicating Activity From Users In a Social Network," filed on May 17, 2013, which is hereby incorporated by reference in its entirety for all purposes.

BACKGROUND

A social network can be an online system that provides a forum for users to interact with one another. A user of a social network may have a profile page where the user can post content, such as text, images, and video, etc., to the user's profile page for viewing by other users in the social network.

SUMMARY

The subject technology provides for a computer-implemented method, the method including receiving, by a processor, an indication of user activity from a first user with respect to a post, where the post includes content shared by a second user. The method may further include creating, by the processor, an activity post providing an indication of the user activity with respect to the post in response to receiving the indication, the activity post including the content. The method may further include identifying a set of users that the activity post is visible to, the set of users including one or more users selected from users associated with the first user in a social graph. The method may further include providing, by the processor, the activity post for display to the set of users in response to receiving the indication.

The user activity may include an endorsement of the post. The user activity may include a comment on the post. The content may include an image, video, audio, or resource. Providing the activity post for display to the set of users may include displaying the post in a stream of the set of users. Providing the activity post may include generating a score for the post and providing the activity post to the set of users based on the score.

The set of users may include one or more users that the first user has indicated as authorized users for viewing the activity post. Identifying the set of users may include identifying a first set of users, the first set of users including one or more users authorized to view the activity post, identifying a second set of users, the second set of users including one or more users authorized to view the post and identifying one or more common users appearing in the first set of users and the second set of users, where the set of users includes the one or more common users.

The method may further include receiving a second indication of user activity by a third user with respect to the post. The method may further include responsive to the second indication, generating a modified activity post, the modified activity post providing an additional indication of the user activity by the third user with respect to the post. The method may further include identifying a second set of users, the second set of users including one or more users selected from the set of users that are associated with the third user. The method may further include providing, by the processor, the modified activity post for display to the second set of users in lieu of the activity post in response to the second indication.

The users that are associated with the third user may include one or more users authorized to view activity posts of the third user. The method may further include providing a notification to the first user in response to receiving the indication that an activity post is being generated in response to the user activity and generating the activity post in response to receiving user acceptance of the notification. The notification may include a mechanism for selecting users authorized to view the activity post. The method may further include receiving a selection of the users from the first user using the mechanism and identifying the set of users by comparing the one or more users to a list of users authorized to view the post, where the set of users includes at least one user of the one or more users that appears within the list of users.

Yet another aspect of the subject technology provides a system. The system includes one or more processors, and a memory including instructions stored therein, which when executed by the one or more processors, cause the processors to perform operations including receiving, by a processor, an indication of user activity from a first user with respect to a post, where the post includes content shared by a second user. The operations may further include creating, by the processor, an activity post providing an indication of the user activity with respect to the post in response to receiving the indication, the activity post including the content. The operations may further include generating an access control list ("ACL") for the activity post, the ACL including a set of authorized users, the set of authorized users including one or more users selected from users associated with the first user in a social graph authorized to view the activity post. The operations may further include providing, by the processor, the activity post for display according to the ACL in response to receiving the indication.

Generating the ACL may include identifying a first set of users, the first set of users including one or more users authorized to view the activity post, identifying one or more common users of the first set of users authorized to view the post and providing the one or more common users as the authorized set of users.

The operations may further include receiving a second indication of user activity by a third user with respect to the post and responsive to the second indication, generating a modified activity post, the modified activity post providing an additional indication of the user activity by the third user with respect to the post. The operations may further include generating a second ACL, the second ACL including one or more users selected from the set of authorized users that are associated with the third user and providing, by the processor, the modified activity post for display according to the second ACL.

The operations may further include providing a notification to the first user that an activity post is being generated in response to the user activity, in response to receiving the indication and providing the activity post for display in response to receiving user acceptance of the notification. The action on the post may include one of an endorsement of the post, a comment on the post, or sharing of the post.

Yet another aspect of the subject technology provides a non-transitory machine-readable medium including instructions stored therein, which when executed by a machine, cause the machine to perform operations including receiving user input from a first user indicating user activity for a post, where the post includes content shared by a second user and the user activity includes a social action with respect to the post. The operations may further include creating a activity post indicating the user activity of the first user with respect to the post in response to receiving the user input, the activity post including the content from the post and an ACL indicating a set of users that may view the activity post and providing the activity post to the set of users for viewing in response to receiving the user input. The set of user of the ACL may include one or more users that the first user has indicated are authorized to view the activity post and the second user has indicated are authorized to view the post.

These and other implementations may provide one or more of the following advantages. For instance, the subject technology may provide a single location on the Internet where a user views the activities performed by the user's friends/contacts throughout an online social network and/or other parts of the Internet. Further, the user may discover new contacts based on the activities performed by the user's friends.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The features of the subject technology are set forth in the appended claims. However, for purpose of explanation, several configurations of the subject technology are set forth in the following figures.

FIG. 1 conceptually illustrates a graphical user interface (GUI) for an initial time that a user endorses a post in which some configurations of the subject technology can be implemented.

FIG. 2B conceptually illustrates a GUI that shows a post endorsed by multiple users in which some configurations of the subject technology can be implemented.

DETAILED DESCRIPTION

Figure 2A:
FIG. 2A conceptually illustrates a GUI that shows a previously endorsed post in which some configurations of the subject technology can be implemented.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

In a given online social networking service/system ("online social network"), a user may have difficulty discovering content their friends/contacts are creating through various activities. In one example, a user may endorse a post provided by another user (e.g., through a social annotation). As used herein, a social annotation may include information or message related to a user and/or other users that are associated with the user. For instance, a social annotation may annotate a given post with information regarding the user's actions associated with the post, or actions by other users associated with the user (e.g., the user's contacts). In an example where a user endorsed a post, a social annotation may indicate that the user has "plus oned" the post.

However, the user's contacts in the online social network may not be aware the user's activity of endorsing the post since the activity may not appear in the contacts' streams in the online social network. In an existing implementation, the user may be required to create a separate new post that re-shares the content from that original post in order to have the content from the original post appear in the respective streams of the user's contacts. Re-sharing content by creating a new post, however, may have a drawback of not including activity of other users that may be commenting or endorsing the original post.

The subject technology provides an "activity" post(s) that may be created as users generate activity through their interactions with the online social network, a given search engine and/or other parts of the Internet (e.g., sites, services, etc.). As used herein, an activity post refers to a post that indicates a user's activity in another post (or other part of the Internet) and may include the original content from the other post. In one example, the user may control, with granularity, which set of users that the user's activity posts are visible. With the user's consent, the activity posts are then eligible to be shown to the user's contacts in their streams. Thus, the user's contacts will in turn discover content being created/curated/consumed by someone they know, and both may bond over the shared content included in such activity posts. Once created, the user may also delete the activity post at any time.

Further, the subject technology may provide a history or log of a user's activity in the online social network, a given search engine and/or other parts of the Internet (e.g., sites, services, etc.). In one example, the history of user activity may be provided as part of the user's profile or settings in the online social network. For instance, a history of the user's endorsements of posts may be provided. When viewing the history of user activity, the user may then remove any activity shown in the history. For example, the user may remove an endorsement of a post shown in the user's activity history.

In some implementations, an activity post may be a lightweight "wrapper" post that provides a pointer to an original post including content. The activity post may have data including an ID referring to an original post, an author referring to a user that performed some form of activity on the original post, and an access control list (ACL) providing restrictions for which users that may access/see the activity post. In some configurations, an ACL includes a set of permissions for a set of users that apply to a post in the online social network. For instance, an ACL can set viewing, commenting, or other permissions for a set of users to a given activity post. Based at least on the ACL of the activity post, a set of users may be shown the activity post in their respective streams in the online social network. In one example, an intersection of common users from 1) a first set of users in an ACL of the original post, and 2) a second set of users in an ACL of the activity post, are permitted to see the activity post. The user may also modify the set of users included in the ACL of the activity post to include additional users or further restrict users that may view the activity post.

Additionally, the subject technology, in some implementations, may utilize one or more ranking algorithms/techniques to rank and blend such activity posts with other posts in a user's stream. In one example, a post that includes a user's activity (e.g., an endorsement or comment) may be scored higher than another post without the user's activity.

In another aspect, the subject technology provides a graphical element(s) (e.g., a button) that enables a user that is viewing a given activity post to add or follow another user that is author of the original post included in the activity post.

In some implementations, a user's social graph includes the contacts of the user to other users and users groups in the online social network, and the "structure" of the contacts may be in the form of a "graph" where a user is a node and a connection between users is a link between nodes. In one example, a link (e.g., an edge) between nodes in the social graph may be established based on an interaction that occurred between the nodes. For instance, for two nodes that represent respective users, a link between the nodes may indicate that the users are friends within the context of the online social network. In some implementations, the types of connections in a given social graph may include other users that are in direct contact with the user (e.g., e-mail or chat contact, direct contacts on in the online social network, etc.) and users that the user is in indirect contact (e.g., friends of friends, connections of users that have a direct connection to the user, people/entities followed by the user, etc.). The individual nodes and links of the social graph may further include information about actions which are allowed to the individual nodes (corresponding to users), e.g., which kind of information belonging to or being uploaded by a first user that a second user is allowed to view. The social graph may also include the profile of the user in the online social network. In some implementations, the social graph includes content generated by individuals (e.g., blog posts, reviews) as connections to the user. The social graph may include connections within a single network or across multiple networks (separable or integrated). In some examples, public relationships can be included in the social graph through public profiles and/or public social networking services.

In a given online social network, one or more contacts of a user can be organized in a social circle. As used herein, social circles ("circle" or "circles") are categories to which a user can assign their social networking contacts and better control the distribution and visibility of social networking messages. For instance, a social circle can be provided as a data set defining a collection of contacts that are associated with one another. A social circle can be described from the perspective of an individual that is the center of a particular collection of socially interconnected people, or from the aggregate perspective of a collection of socially interconnected people. For example, a user may have different groups of friends, coworkers, and family, and there may be some overlap among those groups (e.g., a coworker who is also considered to be a friend, a family member who is also a coworker). Through the creation and use of social circles, the user can organize and categorize social networking contacts into various different groupings.

In the context of the user's social graph, the social circle may represent a grouping of one or more contacts from the user's social graph based on a level of trust or a type of relationship. For instance, the user can create a circle for friends and another circle for coworkers. The social networking service may graphically represent the social circle with the grouping of contacts as a circle shape in which one or more graphical representations (e.g., avatars, profile pictures, icons, etc.) are included within the circle shape. Other graphical representations may be utilized to represent the social circle.

FIG. 1 conceptually illustrates a graphical user interface (GUI) 100 in which some configurations of the subject technology may be implemented. In the example shown in FIG. 1, the GUI 100 represents a post by a user in an online social network. The GUI 100 can include different sets of graphical elements for providing a post by a user in an online social network. A graphical element can include, but is not limited to, a button, check box, radio button, slider, list box, drop-down list, menu, combo box, icon, text box, scroll bar, etc.

The post shown in the GUI 100 includes content that may be shown in a respective stream of a user in the online social network. In one example, the post is published as a public post and is viewable by all users of the online social network or the Internet. In some implementations, however, the post may be restricted for viewing to a set of users or private. As illustrated in the example GUI 100, different graphical representations 105, 110, 115 and 120 of users (e.g., icons, avatars, profile photos, etc.) are shown. The users may be contacts in a user's social graph, e-mail contacts, different users of the web page, or other users in the online social network that are not directly or indirectly connected with the user, etc. In FIG. 1, the contact corresponding to graphical representation 105 is an author of the post shown in the GUI 100.

In some implementations, the GUI 100 includes a graphical element 150 (e.g., a button) configured to enable a user to endorse the post shown in the GUI 100. Endorsing a post (or other content) by a user may be referred to as "plus one'ing" ("+1'ing") a post in some examples. The subject technology, in some implementations, creates a new activity post after the user selects the button 150 to endorse the post. In one example, the new activity post, by default, will be visible to the contacts in the user's circles as defined by an ACL included in the new activity post. In a first instance in which the user endorses the post, a graphical element 160 may be provided in the GUI 100 that provides a message indicating that endorsing the post will include the user's activity in the respective streams of the contacts in the user's circles. The message may include a link to provide the user more information about this feature and an explanation for changing settings for the feature. In some implementations, the new activity post is created after the graphical element 160 is provided for display to the user. As further shown, the GUI 100 also includes an aggregate count of a number of users that have previously endorsed the post.

Although the example in FIG. 1 covers creating a new activity post in response to the user endorsing the post, it should be understood that other types of actions by the user may create a new activity post. For instance, in some implementations, the user may upload content (e.g., photo, video, etc.), create a playlist of different content, or provide comments to other posts or content to create a new activity post(s). In some examples, the user may endorse other content including individual web pages, web links, web sites, etc.

The GUI 100 may include a graphical element for re-sharing the post to other users. For example, the GUI 100 includes a button 155 for re-sharing the post. In this regard, the button 155 enables the user to re-share the post to one or more designated contacts including users from the user's social graph, social circles or other groups. In some implementations, re-sharing the post creates a new post including the content from the post shown in the GUI 100. However, in some implementations, user activity from the post shown in the GUI 100 is not included in the new post with the re-shared content.

GUI 100 further includes display areas 130, 135 and 140 that respectively correspond to various comments from users. For instance, a user corresponding to the graphical representation 110 is associated with a comment shown in the display area 130. Each comment may be visible to all viewers of the post in some configurations.

The GUI 100 enables a user to submit a new comment by inputting comment data (e.g., via keyboard input) into a text-box 170. In addition to keyboard input, other types of input can be accepted and still be within the scope of the subject technology. For instance, some configuration could accept voice input for submitting a comment.

Additionally, although the GUI 100 includes certain graphical elements, it should be understood that the GUI 100 is not required to include all graphical elements shown in FIG. 1. Moreover, the GUI 100 could include more graphical elements than shown in the example of FIG. 1.

FIG. 2A conceptually illustrates a graphical user interface (GUI) 200 in which some configurations of the subject technology may be implemented. In the example shown in FIG. 2A, the GUI 200 represents an activity post that includes an original post that was previously endorsed by a user ("endorsing user") represented by a graphical representation 205 in an online social network. A message 210 may indicate that the endorsing user has endorsed an original post (e.g., the post shown in the GUI 100 in FIG. 1) included in the activity post (e.g., by "plus one'ing" the original post).

As illustrated, the activity post shown in the GUI 200 includes content included in the original post that was endorsed by the endorsing user. In one example, the activity post in FIG. 2A may be provided for display to one or more contacts. For example, the activity post may be shown in the streams of one or more of the contacts included the endorsing user's circles, a user profile of the endorsing user and/or one or more of the contacts, the activity log of the endorsing user and/or one or more of the contacts, along with a web search or social search result, in association with objects referenced in the post, and/or in association with other surfaces or areas where such social activity may be of interest to a viewing user. In one example, the contacts are identified based on an ACL of the activity post. For instance, an intersection of common users from 1) a first set of users in an ACL of the original post, and 2) a second set of users in the ACL of the activity post, are permitted to view the activity post. Further, the activity post may be provided to one or more contacts based on a ranking algorithm that computes a score for the activity post based on a "snapshot" of the original post at a time when the activity post was created. If the activity post is sufficiently ranked based on the computed score, the activity post is then provide to one or more of the contacts. These contacts may subsequently endorse, comment on, or re-share the original post included in the activity post. In some examples, the comments or endorsements are applied to the original post included in the activity post and the endorsing user may receive notifications of such activity (e.g., via the online social network, e-mail, mobile application, etc.). The GUI 200 further includes a graphical element 215 (e.g., button) that enables the endorsing user's contacts to add the original post author to their contacts or circles.

FIG. 2B conceptually illustrates a graphical user interface (GUI) 250 in which some configurations of the subject technology may be implemented. In the example shown in FIG. 2A, the GUI 250 represents an activity post that includes an original post that was previously endorsed by multiple users ("endorsing users") respectively represented by graphical representations 205, 255, 260, 265 and 270 in an online social network. A message 280 may indicate that multiple endorsing users have endorsed an original post (e.g., the post shown in the GUI 100 in FIG. 1) included in the activity post (e.g., by "plus one'ing" the original post). The GUI 250 includes similar graphical elements described above in the discussion of FIG. 2A.

In some implementations, when multiple users have endorsed the original post, a single activity post may be generated and provided to the common contacts of the endorsing users (instead of showing multiple activity posts that reference the same original post). For example, if two respective users have endorsed the original post and the two users both have a common user as a contact that the activity post for each user is provided to, a single activity post may be provided to the common user. In one example, graphical representations of the two respective users may be included in the activity post to indicate to the common user that these two users have endorsed the original post.

Figure 3:
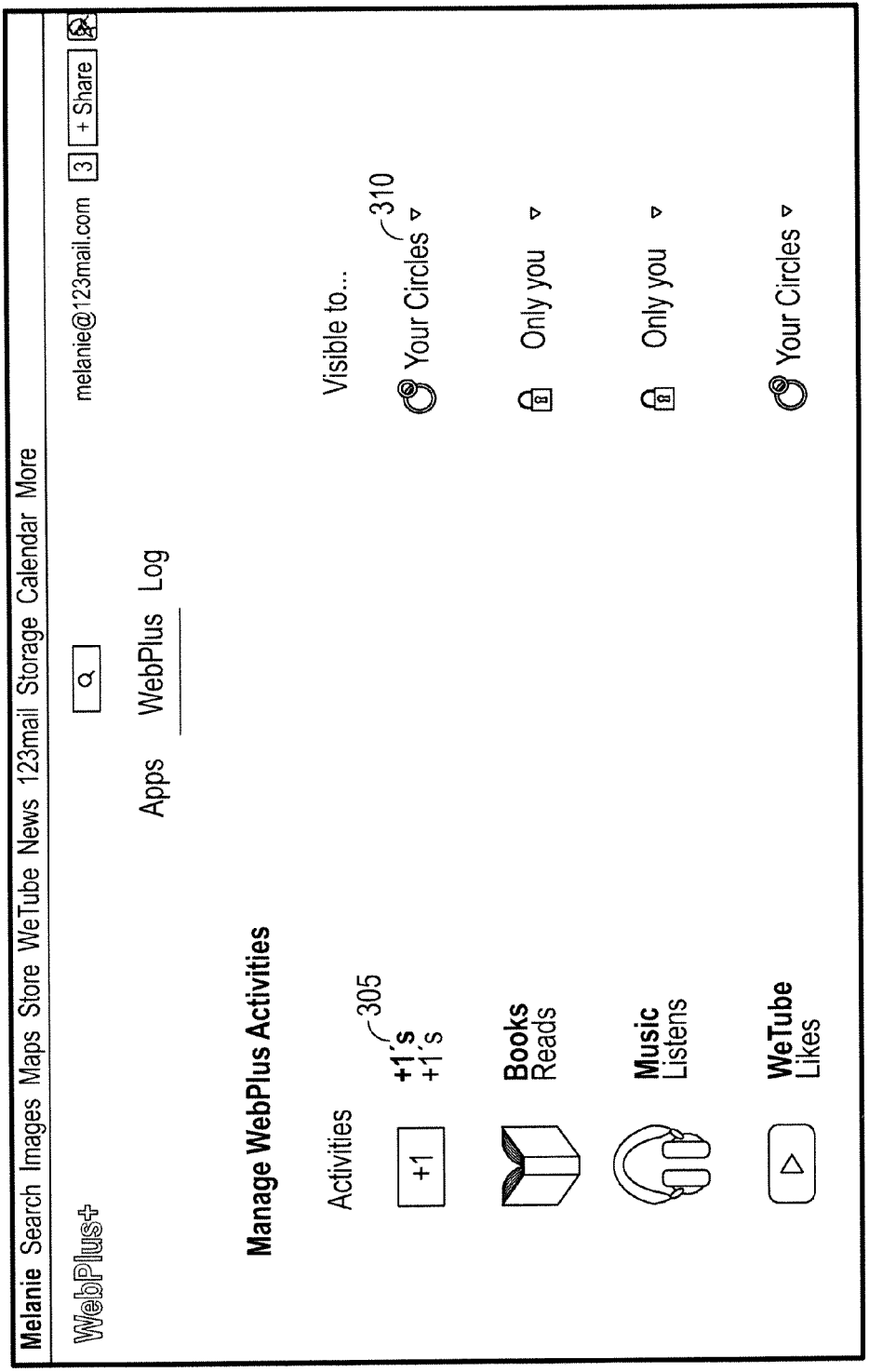
FIG. 3 conceptually illustrates a GUI for configuring the visibility of user activities in which some configurations of the subject technology can be implemented.

FIG. 3 conceptually illustrates a graphical user interface (GUI) 300 in which some configurations of the subject technology may be implemented. In the example shown in FIG. 3, the GUI 300 includes settings for managing the visibility of one or more sources of activity for a given user in an online social network. In some implementations, the user may access the settings shown in GUI 300 via a link on an activity post, a link in the user's profile page or via a link at another web page or portion of the online social network. The GUI 300 includes an activity source 305 and a setting 310 corresponding to a setting for configuring the visibility of the user's endorsements of posts. As illustrated, the user's endorsement activity is visible to contacts in the user's circles in the online social network. In one example, the user may globally configure each ACL included in the user's activity posts by selecting the setting 310. Selecting the setting 310 may provide for display another GUI described in further detail in the following description of FIG. 4.

Figure 4:
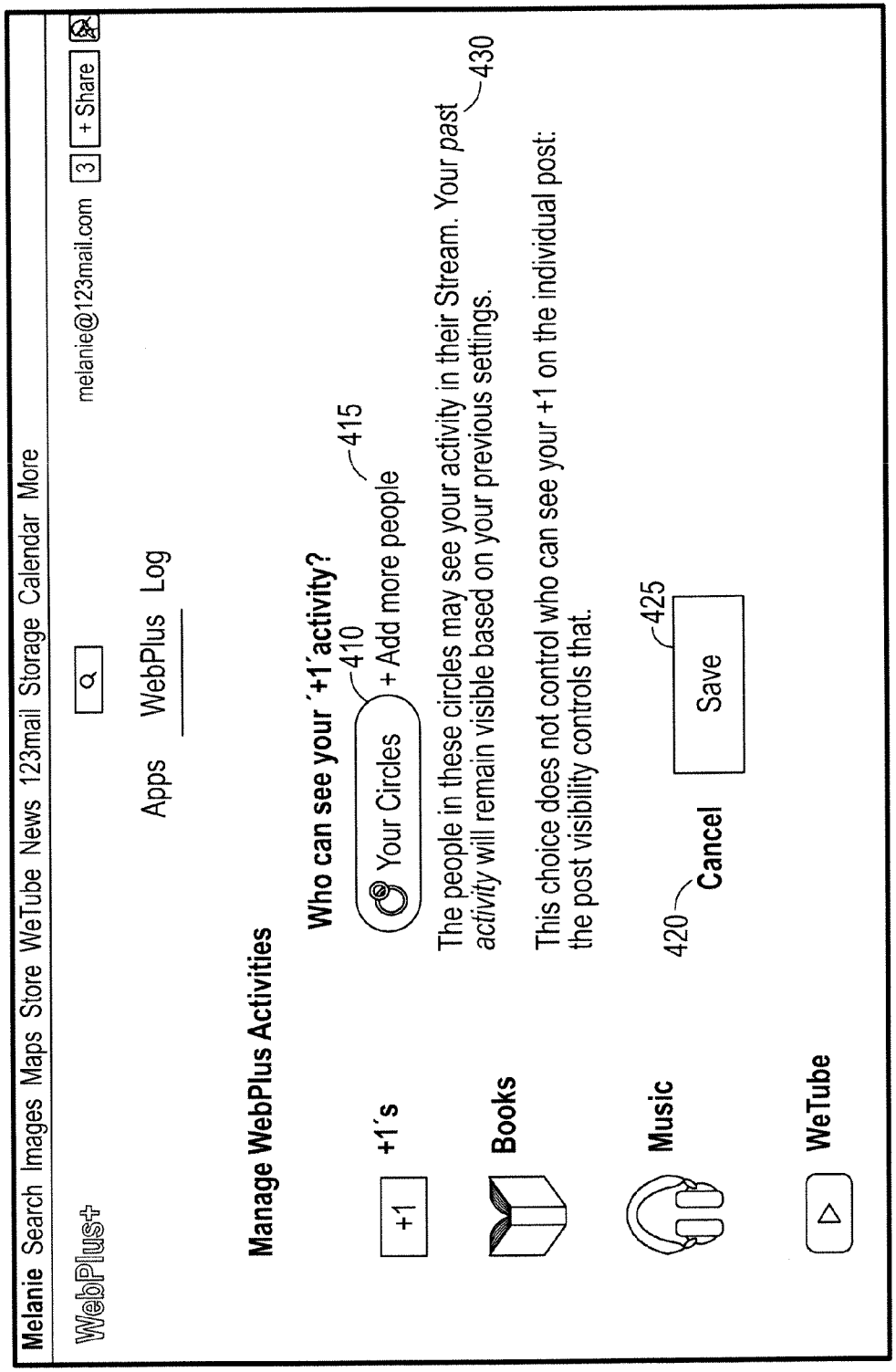
FIG. 4 conceptually illustrates a GUI for configuring a setting for the visibility of a user's endorsement activity to other users.

FIG. 4 conceptually illustrates a graphical user interface (GUI) 400 in which some configurations of the subject technology may be implemented. In the example shown in FIG. 4, the GUI 400 includes graphical elements for configuring a setting for the visibility of the user's endorsement activity to other users (e.g., corresponding to the setting 310 described in FIG. 3). For instance, the user's endorsement activity may include any activity posts that are created based on the user's previous endorsement activity.

As shown, the GUI 400 includes a graphical element 410 indicating a set of users (e.g., "Your Circles") that the user's endorsement activity is currently visible to. Further, the GUI 400 includes a graphical element 415 that enables a user to add more users or contacts. The user may also remove users or contacts in the GUI 400. The GUI 400 further includes a graphical element 420 to cancel any changes to the setting, and a graphical element 425 to save any changes to the setting. In one example, an ACL of a future activity post for the user will be based on the saved changes modifying the setting. Thus, past activity posts of the user will retain the previous setting. It should be further understood that changes to the setting do not modify an original post referenced by a given activity post nor the visibility of endorsements by other users on the original post. The GUI 400 may further include a link 430 to access an activity log of a user, which is described in the following discussion of FIG. 5.

Figure 5:
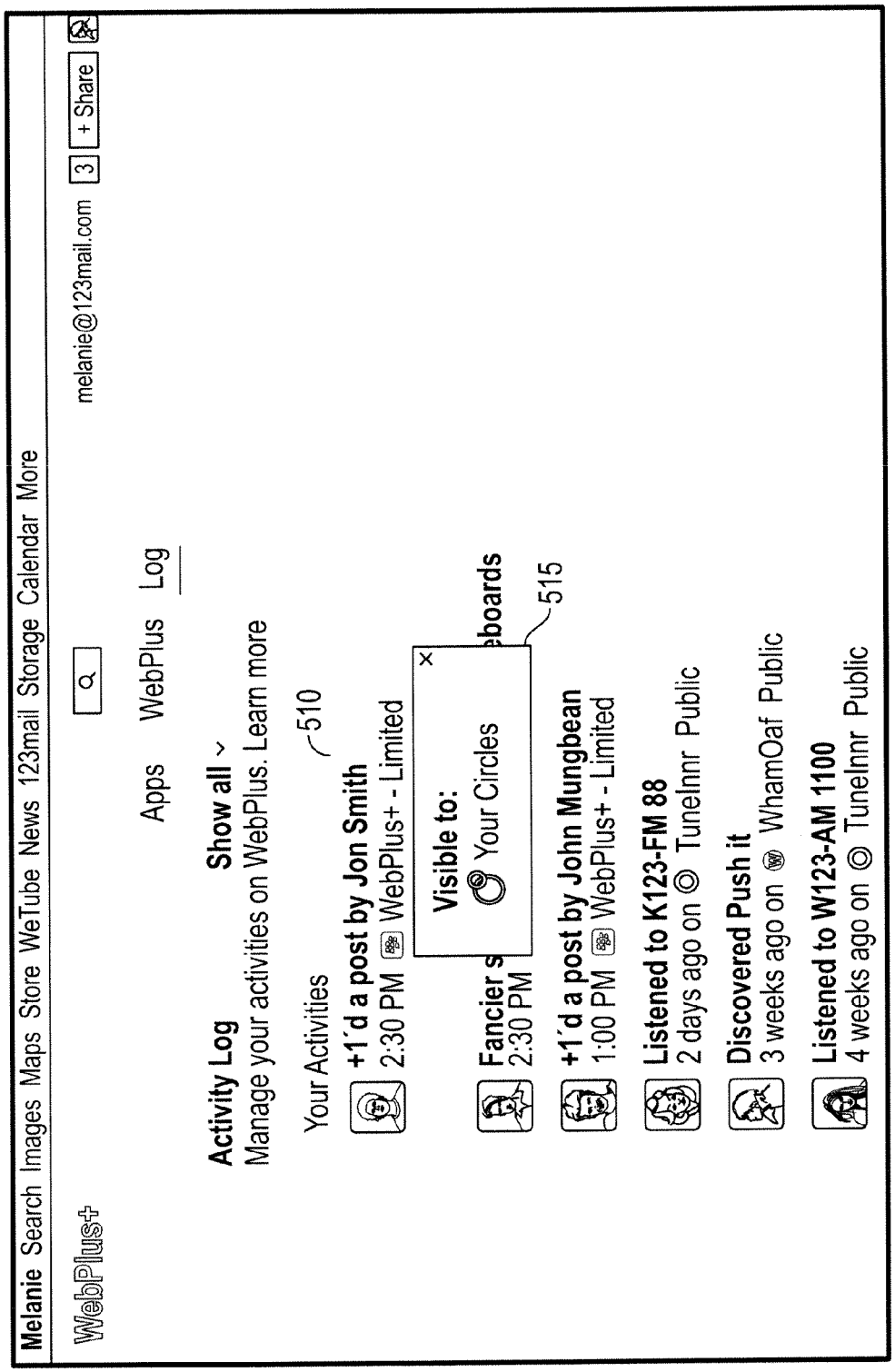
FIG. 5 conceptually illustrates a GUI that shows an activity log in which some configurations of the subject technology can be implemented.

FIG. 5 conceptually illustrates a graphical user interface (GUI) 500 in which some configurations of the subject technology may be implemented. In the example shown in FIG. 5, the GUI 500 includes graphical elements showing an activity log of a user's previous activity in the online social network or across one or more sites or parts of the Internet. In some implementations, the user may access the activity log shown in GUI 500 via a link in the user's profile page or via a link at another web page or portion of the online social network.

As shown, a listing of previous activity instances by a user is included in the GUI 500. In the GUI 500, the user selects an activity instance 510 corresponding to a previous endorsement of a post for configuring a visibility setting of this previous activity to other user. The activity instance 510 represents an activity post in one example. As further shown, the GUI 500 includes a graphical display area 515 that displays the current visibility setting (e.g., "Your Circles"). The user may modify the current visibility setting of the activity post via the graphical display area 515 to include one or more additional users or groups of users, or to further restrict the visibility of the activity post (e.g., by removing users). In one example, the user may 'hide' the activity post by configuring the visibility setting to be visible solely to the user. In some implementations, modifying the current visibility setting modifies an ACL corresponding to the activity post to indicate a set of users that may view the activity post based on the modified visibility setting.

Figure 6:
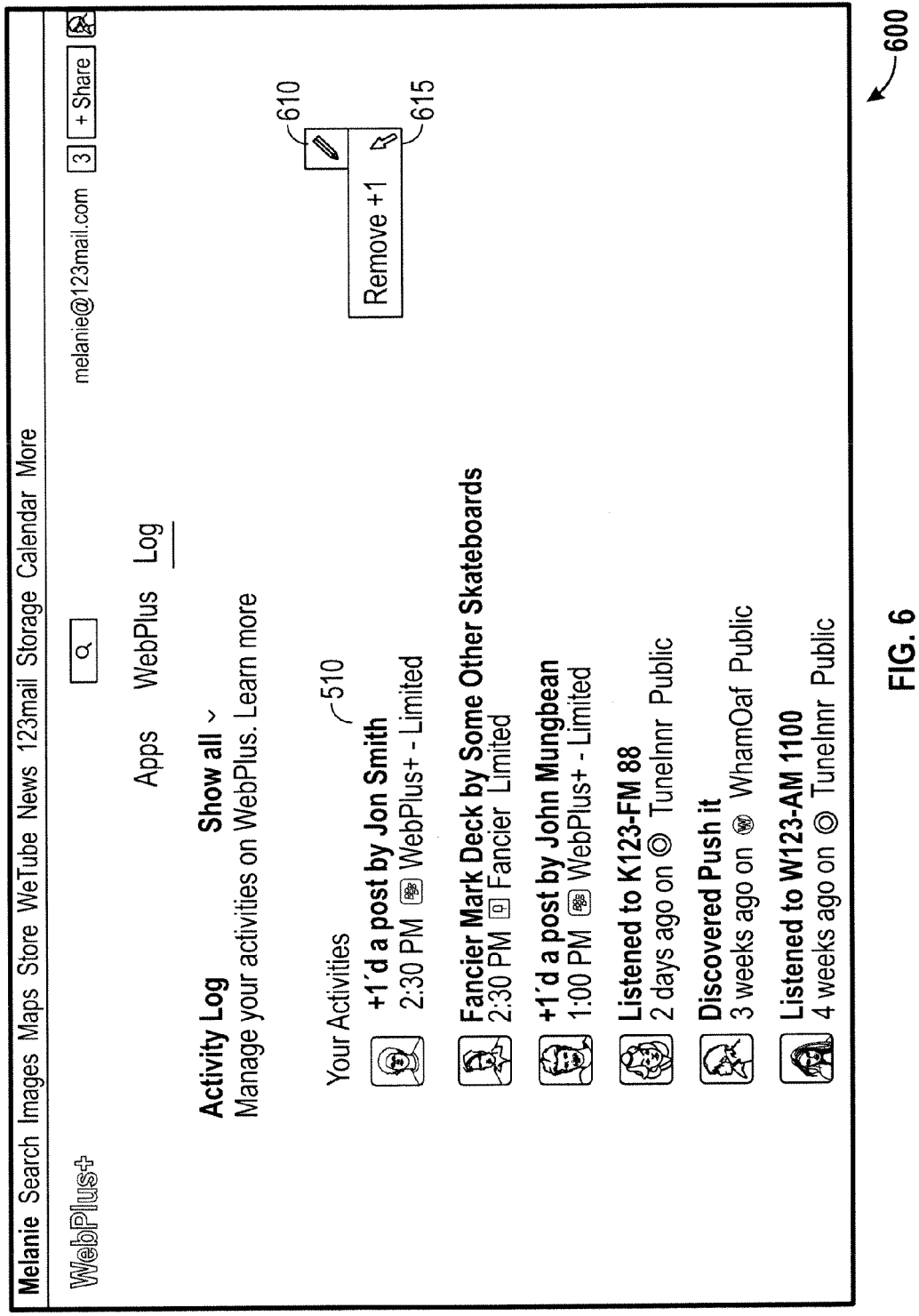
FIG. 6 conceptually illustrates a GUI that shows removing a previous endorsement activity in an activity log in which some configurations of the subject technology can be implemented.

FIG. 6 conceptually illustrates a graphical user interface (GUI) 600 in which some configurations of the subject technology may be implemented. In the example shown in FIG. 6, the GUI 600 includes graphical elements for removing a previous endorsement activity in an activity log of a user. The GUI 600 includes similar graphical elements to those discussed in the GUI 500 of FIG. 5.

As shown, a listing of previous activity instances by a user is included in the GUI 600. In the GUI 600, the user selects a graphical element 610 (e.g., an icon) for removing the activity instance 510 corresponding to the activity post. As further shown, the GUI 600 includes a graphical display area 615 that may be displayed upon selection of the graphical element 610. The user may select the graphical display area 615 (e.g., mouse-click input, touch input, etc.) to delete the activity post corresponding to the activity instance 510. After, deleting the activity post, the subject technology may provide a GUI confirming the deletion of the activity post as described in the following description of FIG. 7.

Figure 7:
FIG. 7 conceptually illustrates a GUI that shows a result of a removal of previous endorsement activity in an activity log in which some configurations of the subject technology can be implemented.

FIG. 7 conceptually illustrates a graphical user interface (GUI) 700 in which some configurations of the subject technology may be implemented. In the example shown in FIG. 7, the GUI 700 includes graphical elements that show a result of a removal of previous endorsement activity in an activity log of a user described in FIG. 6. More specifically, the GUI 700 includes similar graphical elements to those discussed in the GUI 500 of FIG. 5.

As shown, the GUI 700 includes a message 710 that indicates that the endorsement activity has been deleted or removed from the online social network. In some implementations, the activity post of the user, the user's endorsement of the original post referenced by the activity post, and any of the user's activity performed on the original post are deleted. It should be understood, however, that the original post referenced by the activity post and activity by other users on the original post are not deleted.

Figure 8:
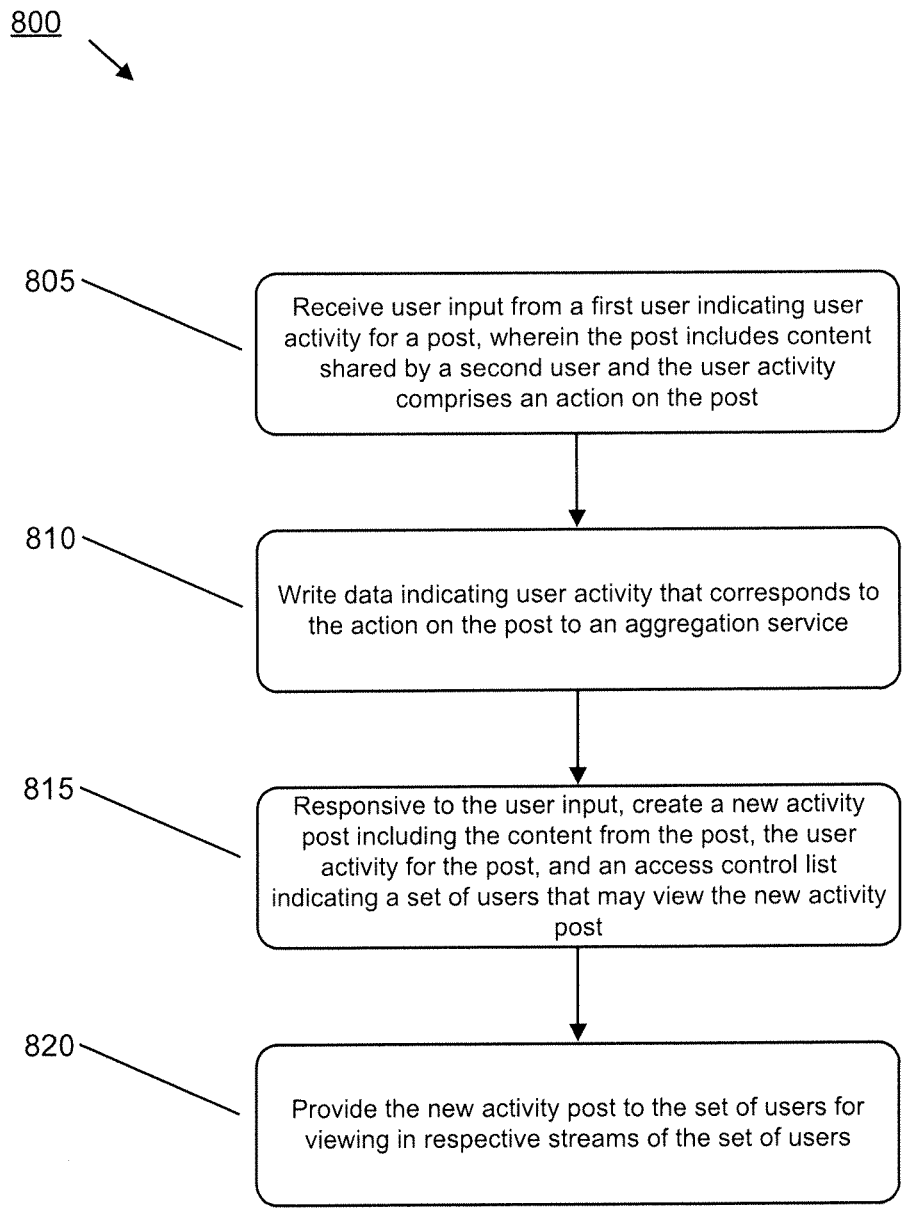
FIG. 8 conceptually illustrates an example process for creating a new activity post based on user activity.

FIG. 8 conceptually illustrates an example process 800 for creating a new activity post based on user activity. The process 800 can be performed on one or more computing devices in some configurations.

The process 800 begins at 805 by receiving, by a processor, user input from a first user indicating user activity for a post (e.g., an activity post). In one example, the post includes content shared by a second user (e.g., an author of the activity post) and the user activity is an action on the post. For instance, the action on the post may be an endorsement of the post, a comment, or another type of social annotation of the post.

In some implementations, the process 800 at 810 writes (or submits a request including) data indicating user activity that corresponds to the action on the post to an aggregation service, which may log each action performed by a user(s) on each post in the online social network. In one example, the data provided by the aggregation service enables an aggregate count, for a given post, to be determined indicating how many and which friends or contacts of the user that have endorsed that post (e.g., data illustrated in FIG. 2B, message 280, and users corresponding to graphical representations 205, 255, 260, 265, 270).

Responsive to the user input, the process 800 at 815 creates, by the processor, a new activity post including the content from the post, the user activity for the post, and an access control list indicating a set of users that may view the new activity post. At 820, the process 800 provides, by the processor, the new activity post for display to the set of users. For example, the activity post may be shown in the streams of one or more of the contacts included the endorsing user's circles, a user profile of the endorsing user and/or one or more of the contacts, the activity log of the endorsing user and/or one or more of the contacts, along with a web search or social search result, in association with objects referenced in the post, and/or in association with other surfaces or areas where such social activity may be of interest to a viewing user. The process 800 then ends.

Figure 9:
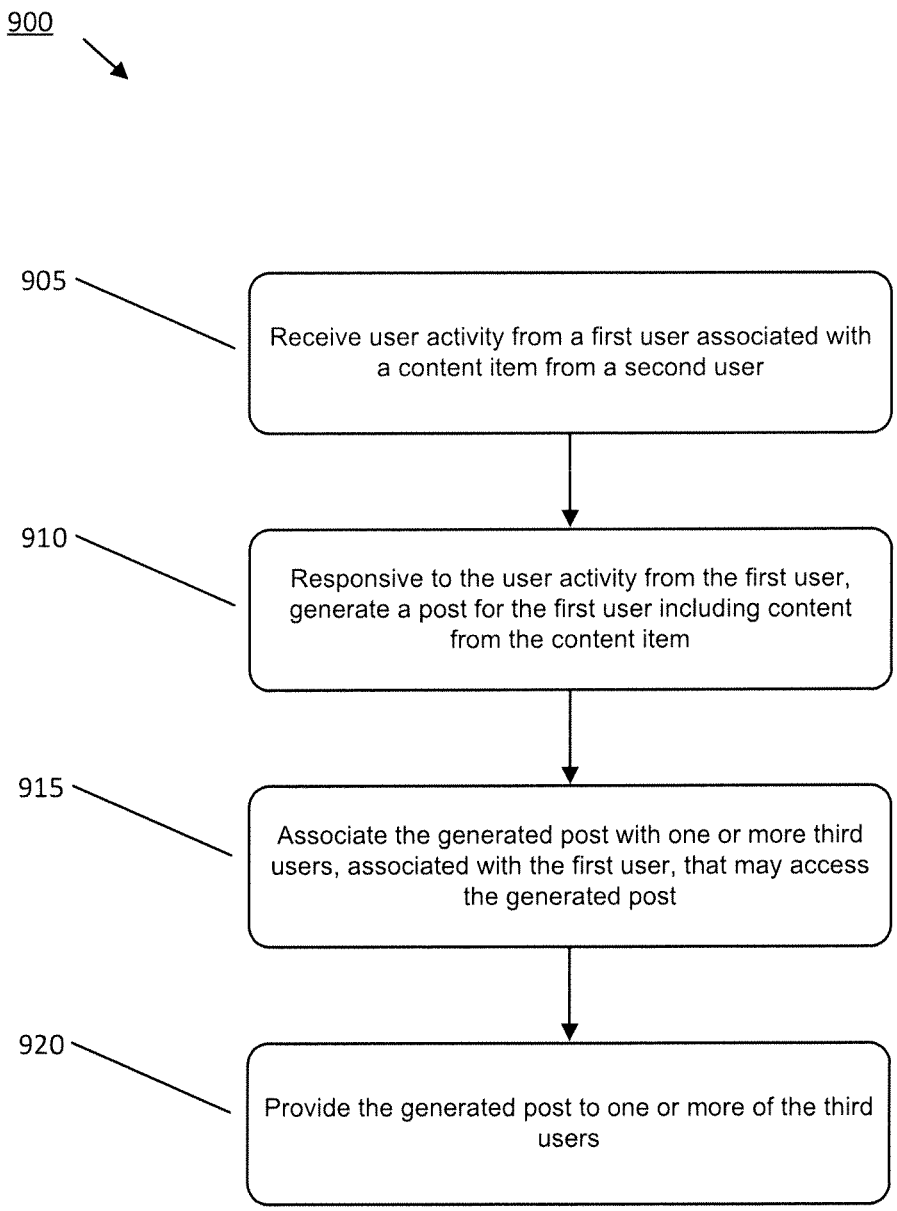
FIG. 9 conceptually illustrates an example process for creating a new activity post based on user activity.

FIG. 9 conceptually illustrates an example process 900 for creating a new activity post based on user activity. The process 900 may be performed using one or more computing devices, in some configurations.

The process 900 begins at 905 by receiving user activity from a first user associated with a content item from a second user. In one example, the user activity associated with the content item may be an endorsement of a post, a comment, or another type of social annotation of a post. The content item from the second user may include an image, video, audio, resource, other multimedia content, text, document, event, calendar, game, etc. Further, the content item was shared by the second user in one example.

Responsive to the user activity from the first user, the process 900 at 910 generates a post for the first user including content from the content item. In one example, generating the post occurs automatically and without requiring further user intervention.

The process 900 at 915 associates the generated post with one or more third users, associated with the first user, that may access the generated post. In one example, associating the generated post includes determining the one or more third users based on a social graph of the first user. In one example, the third users are identified based on an ACL of the post. For instance, the third users may include a first set of users associated with the content item or the second user (e.g., users that the content item is visible to) and/or a second set of users associated with the first user or the post. In one example, the third users may include users that are an intersection of common users from the first set of users and the second set of users. At 920, the process 900 provides the generated post to one or more of the third users. Providing the generated post, in one example, includes providing the generated post in an online social network. Providing the generated post may include providing the in the streams of first user and/or one or more of the third users, a user profile of the first user and/or one or more of the third users, the activity log of the first user and/or one or more of the third users, along with a web search or social search result, in association with objects referenced in the post, and/or in association with other surfaces or areas where such social activity may be of interest to a viewing user. The process 900 then ends.

Many of the above-described features and applications are implemented as software processes that are specified as a set of instructions recorded on a non-transitory machine readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of machine readable media include, but are not limited to, CD-ROMs, flash drives, RAM chips, hard drives, EPROMs, etc. The machine readable media does not include carrier waves and electronic signals passing wirelessly or over wired connections.

In this specification, the term "software" is meant to include firmware residing in read-only memory and/or applications stored in magnetic storage, which can be read into memory for processing by a processor. Also, in some implementations, multiple software components can be implemented as sub-parts of a larger program while remaining distinct software components. In some implementations, multiple software subject components can also be implemented as separate programs. Finally, a combination of separate programs that together implement a software component(s) described here is within the scope of the subject technology. In some implementations, the software programs, when installed to operate on one or more systems, define one or more specific machine implementations that execute and perform the operations of the software programs.

A computer program (also known as a program, software, software application, script, or code) can be written in a form of programming language, including compiled or interpreted languages, declarative or procedural languages, and it can be deployed in some form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some configurations are implemented as software processes that include one or more application programming interfaces (APIs) in an environment with calling program code interacting with other program code being called through the one or more interfaces. Various function calls, messages or other types of invocations, which can include various kinds of parameters, can be transferred via the APIs between the calling program and the code being called. In addition, an API can provide the calling program code the ability to use data types or classes defined in the API and implemented in the called program code.

Figure 10:
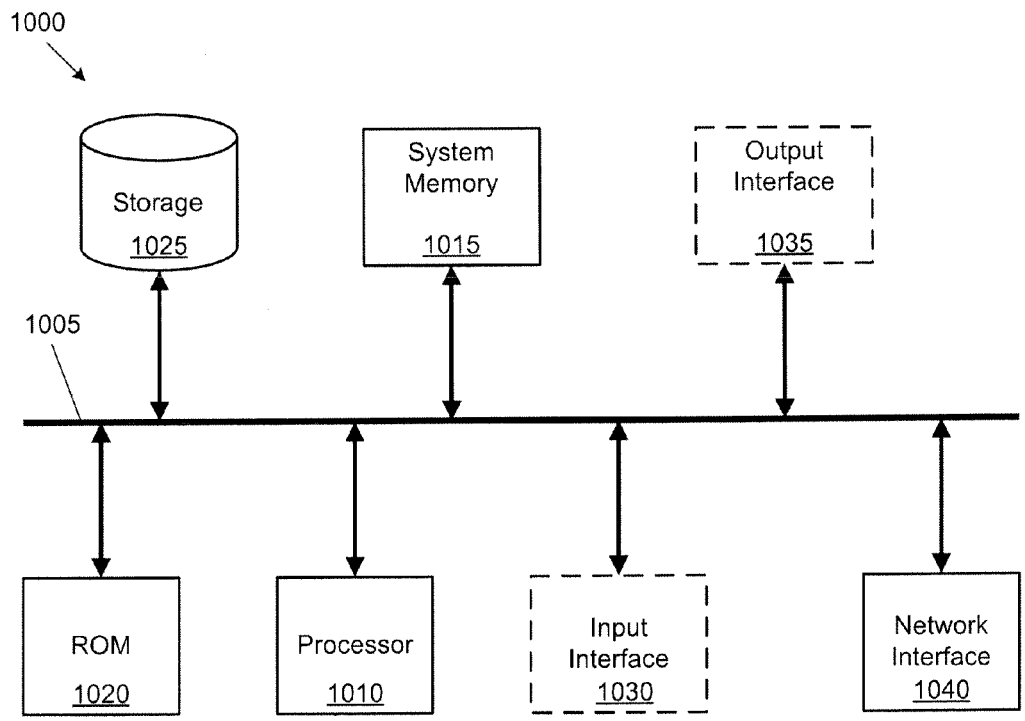
FIG. 10 conceptually illustrates a system with which some implementations of the subject technology may be implemented.

FIG. 10 conceptually illustrates a system 1000 with which some implementations of the subject technology can be implemented. The system 1000 can be a computer, phone, PDA, or another sort of electronic device. In some configurations, the system 1000 includes a television with one or more processors embedded therein. Such a system includes various types of computer readable media and interfaces for various other types of computer readable media. The system 1000 includes a bus 1005, processing unit(s) 1010, a system memory 1015, a read-only memory 1020, a storage device 1025, an optional input interface 1030, an optional output interface 1035, and a network interface 1040.

The bus 1005 collectively represents all system, peripheral, and chipset buses that communicatively connect the numerous internal devices of the system 1000. For instance, the bus 1005 communicatively connects the processing unit(s) 1010 with the read-only memory 1020, the system memory 1015, and the storage device 1025.

From these various memory units, the processing unit(s) 1010 retrieves instructions to execute and data to process in order to execute the processes of the subject technology. The processing unit(s) can be a single processor or a multi-core processor in different implementations.

The read-only-memory (ROM) 1020 stores static data and instructions that are needed by the processing unit(s) 1010 and other modules of the system 1000. The storage device 1025, on the other hand, is a read-and-write memory device. This device is a non-volatile memory unit that stores instructions and data even when the system 1000 is off. Some implementations of the subject technology use a mass-storage device (such as a magnetic or optical disk and its corresponding disk drive) as the storage device 1025.

Other implementations use a removable storage device (such as a flash drive, a floppy disk, and its corresponding disk drive) as the storage device 1025. Like the storage device 1025, the system memory 1015 is a read-and-write memory device. However, unlike storage device 1025, the system memory 1015 is a volatile read-and-write memory, such a random access memory. The system memory 1015 stores some of the instructions and data that the processor needs at runtime. In some implementations, the subject technology's processes are stored in the system memory 1015, the storage device 1025, and/or the read-only memory 1020. For example, the various memory units include instructions for processing multimedia items in accordance with some implementations. From these various memory units, the processing unit(s) 1010 retrieves instructions to execute and data to process in order to execute the processes of some implementations.

The bus 1005 also connects to the optional input and output interfaces 1030 and 1035. The optional input interface 1030 enables the user to communicate information and select commands to the system. The optional input interface 1030 can interface with alphanumeric keyboards and pointing devices (also called "cursor control devices"). The optional output interface 1035 can provide display images generated by the system 1000. The optional output interface 1035 can interface with printers and display devices, such as cathode ray tubes (CRT) or liquid crystal displays (LCD). Some implementations can interface with devices such as a touchscreen that functions as both input and output devices.

Finally, as shown in FIG. 10, bus 1005 also couples system 1000 to a network interface 1040 through a network adapter (not shown). In this manner, the computer can be a part of a network of computers (such as a local area network ("LAN"), a wide area network ("WAN"), or an Intranet, or an interconnected network of networks, such as the Internet. The components of system 1000 can be used in conjunction with the subject technology.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a non-transitory machine-readable or non-transitory computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and the claims of this application, the terms "computer", "server", "processor", and "memory" all refer to electronic or other technological devices. These terms exclude people or groups of people. For the purposes of the specification, the terms display or displaying means displaying on an electronic device. As used in this specification and the claims of this application, the terms "computer readable medium" and "computer readable media" are entirely restricted to tangible, physical objects that store information in a form that is readable by a computer. These terms exclude wireless signals, wired download signals, and other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be a form of sensory feedback, e.g., visual feedback, auditory feedback, or tactile feedback; and input from the user can be received in a form, including acoustic, speech, or tactile input. In addition, a computer can interact with a user by sending documents to and receiving documents from a device that is used by the user; for example, by sending web pages to a web browser on a user's client device in response to requests received from the web browser.

Configurations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or a combination of one or more such back end, middleware, or front end components. The components of the system can be interconnected by a form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some configurations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that a specific order or hierarchy of steps in the processes disclosed is an illustration of example approaches. Based upon design preferences, it is understood that the specific order or hierarchy of steps in the processes can be rearranged, or that all illustrated steps be performed. Some of the steps can be performed simultaneously. For example, in certain circumstances, multitasking and parallel processing can be advantageous. Moreover, the separation of various system components in the configurations described above should not be understood as requiring such separation in all configurations, and it should be understood that the described program components and systems can generally be integrated together in a single software product or packaged into multiple software products.

The previous description is provided to enable a person skilled in the art to practice the various aspects described herein. Various modifications to these aspects will be readily apparent to those skilled in the art, and the generic principles defined herein can be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa.

Headings and subheadings, if any, are used for convenience only and do not limit the subject technology.

A phrase such as an "aspect" does not imply that such aspect is essential to the subject technology or that such aspect applies to all configurations of the subject technology. A disclosure relating to an aspect can apply to all configurations, or one or more configurations. A phrase such as an aspect can refer to one or more aspects and vice versa. A phrase such as a "configuration" does not imply that such configuration is essential to the subject technology or that such configuration applies to all configurations of the subject technology. A disclosure relating to a configuration can apply to all configurations, or one or more configurations. A phrase such as a configuration can refer to one or more configurations and vice versa.

What is claimed is:

1. A computer-implemented method, the method comprising:
   receiving, by a processor, an indication of user activity from a first user with respect to an original post, wherein the original post includes content shared by a second user;
   creating, by the processor, an activity post providing an indication of the user activity with respect to the original post, in response to receiving the indication, the activity post including the content;
   identifying a first set of users, the first set of users comprising one or more users authorized to view the activity post;
   identifying a second set of users, the second set of users comprising one or more users authorized to view the original post;
   identifying a set of users comprising one or more common users appearing in both the first set of users and the second set of users; and
   providing, by the processor, the activity post for display to the set of users in response to receiving the indication.

2. The method of claim 1, wherein the user activity comprises at least one of an endorsement of the original post or a comment on the original post.

3. The method of claim 1, wherein the content includes an image, video, audio, or resource.

4. The method of claim 1, wherein providing the activity post for display to the set of users comprises displaying the original post in a stream of the set of users.

5. The method of claim 1, wherein providing the activity post further comprises, generating a score for the original post and providing the activity post to the set of users based on the score.

6. The method of claim 1, wherein the set of users comprises one or more users that the first user has indicated as authorized users for viewing the activity post.

7. The method of claim 1, further comprising:
   receiving a second indication of user activity by a third user with respect to the original post;
   responsive to the second indication, generating a modified activity post, the modified activity post providing an additional indication of the user activity by the third user with respect to the original post;
   identifying a second set of users, the second set of users including one or more users selected from the set of users that are associated with the third user; and
   providing, by the processor, the modified activity post for display to the second set of users in lieu of the activity post in response to the second indication.

8. The method of claim 7, wherein the users that are associated with the third user comprise one or more users authorized to view activity posts of the third user.

9. The method of claim 1, further comprising:
   providing a notification to the first user in response to receiving the indication that an activity post is being generated in response to the user activity; and
   generating the activity post in response to receiving user acceptance of the notification.

10. The method of claim 9, wherein the notification further comprises a mechanism for selecting users authorized to view the activity post.

11. The method of claim 10, further comprising:
    receiving a selection of the users from the first user using the mechanism; and
    identifying the set of users by comparing the one or more users to a list of users authorized to view the original post, wherein the set of users comprises at least one user of the one or more users that appears within the list of users.

12. The method of claim 1, wherein the first set of users is identified from a first access control list ("ACL") of the activity post, and wherein the second set of users is identified from a second ACL of the original post.

13. A system comprising:
    one or more processors;
    a memory comprising instructions stored therein, which when executed by the one or more processors, cause the processors to perform operations comprising:
    receiving, by a processor, an indication of user activity from a first user with respect to an original post, wherein the original post includes content shared by a second user;
    creating, by the processor, an activity post providing an indication of the user activity with respect to the original post in response to the receiving the indication, the activity post including the content;
    identifying a first set of users, the first set of users comprising one or more users selected from users associated with the first user in a social graph authorized to view the activity post;
    identifying one or more users of the first set of users authorized to view the original post;
    generating an access control list ("ACL") for the activity post, the ACL including a set of authorized users, the set of authorized users comprising the one or more users of the first set of users authorized to view the original post; and
    providing, by the processor, the activity post for display according to the ACL in response to the receiving the indication.

14. The system of claim 13, the operations further comprising:
    receiving a second indication of user activity by a third user with respect to the original post; and
    responsive to the second indication, generating a modified activity post, the modified activity post providing an additional indication of the user activity by the third user with respect to the original post.

15. The system of claim 14, the operations further comprising:
    generating a second ACL, the second ACL including one or more users selected from the set of authorized users that are associated with the third user; and
    providing, by the processor, the modified activity post for display according to the second ACL.

16. The system of claim 13, the operations further comprising:
   providing a notification to the first user that an activity post is being generated in response to the user activity, in response to receiving the indication; and
   providing the activity post for display in response to receiving user acceptance of the notification.

17. The system of claim 13, wherein the action on the original post comprises one of an endorsement of the original post, a comment on the original post, or sharing of the original post.

18. The system of claim 13, wherein the first set of users is identified from a first ACL of the activity post, and wherein identifying the one or more users of the first set of users authorized to view the original post is based on a second ACL of the original post.

19. A non-transitory machine-readable medium comprising instructions stored therein, which when executed by a machine, cause the machine to perform operations comprising:
   receiving user input from a first user indicating user activity for an original post, wherein the original post includes content shared by a second user and the user activity comprises a social action with respect to the original post;
   creating an activity post indicating the user activity of the first user with respect to the original post, the activity post including the content from the original post and an access control list ("ACL") indicating a set of users that may view the activity post and the original post, in response to receiving the user input; and
   providing the activity post to the set of users for viewing in response to receiving the user input.

20. The machine-readable medium of claim 19, wherein the set of users of the ACL includes one or more users that the first user has indicated are authorized to view the activity post and the second user has indicated are authorized to view the original post.

* * * * *